Patented Apr. 10, 1923.

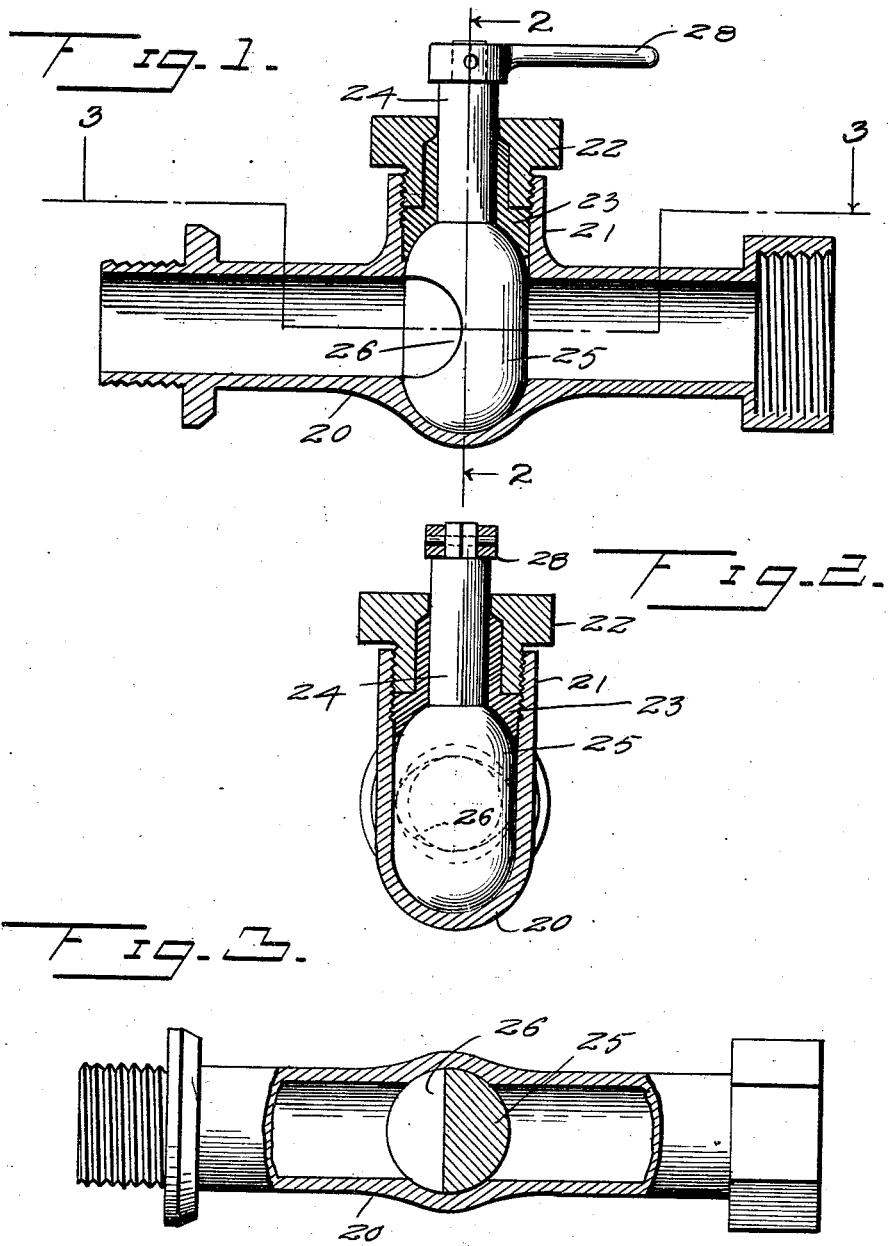

1,451,588

UNITED STATES PATENT OFFICE.

ULRICH REIDT, OF LOS ANGELES, CALIFORNIA.

HOSE VALVE.

Application filed April 24, 1920. Serial No. 376,347.

*To all whom it may concern:*

Be it known that I, ULRICH REIDT, a citizen of Switzerland, residing at Los Angeles, in the county of Los Angeles and State of California, have invented certain new and useful Improvements in Hose Valves; and I do hereby declare the following to be a full, clear, and exact description of the invention, such as will enable others skilled in the art to which it appertains to make and use the same.

This invention relates to valves especially adapted to be used in conjunction with garden hose and a sprinkler and it consists in the novel features hereinafter described and claimed.

An object of the invention is to provide a valve of the character stated which is of simple and durable structure and which may be easily and quickly manipulated to regulate the flow of the water through the hose whereby the water may be admitted to the sprinkler in a desired volume and ejected from the same under a required degree of force or pressure.

An advantage gained by the use of the hose valve as stated is that the attendant is not required to leave the sprinkler and go to a point remote and turn a valve in order to regulate the quantity of the water and the force of pressure thereof at the sprinkler nozzle. Therefore the use of the hose valve saves considerable water and time of the operator especially where the valve is used upon hose which supplies the water to plants in garden, hot houses and the like.

In the accompanying drawing:—

Fig. 1 is a longitudinal sectional view of the hose valve constructed in accordance with my invention.

Fig. 2 is a transverse sectional view of the same.

Fig. 3 is a horizontal sectional view cut on the line 3—3 of Figure 1.

The invention as illustrated in the drawing consists of a body 20 adapted to be connected with the hose and sprinkler in a usual manner the said body being provided at its upper side and at a point between its ends with a boss 21. A stuffing box gland 22 is screw threaded into engagement with the boss 21 and is adapted to retain packing 23 therein in a usual manner. A valve stem 24 is journaled in the boss and gland and carries at its lower end a valve proper 25 which is in the form of a head integral with the stem and recessed at one side as at 26. The lower end of the valve proper 25 fits snugly in a socket 27 provided at the inner side of the body 20. A handle 28 is fixed to the upper end of the stem 24.

With my improved valve it is necessary, only, to give the stem and valve proper a quarter turn in order to permit the water to flow through the body or to interrupt the flow of the water. By reference to the drawing it will be apparent that when the recess 26 is in alignment with the passageway through the body 20 the solid portion of the valve 25 bridges the said passageway and interrupts or shuts off the flow of the water. When the stem 24 and the valve 25 are moved to a position so that the recess 26 is transversely disposed with relation to the passageway through the body 20, the said passageway at the opposite side of the valve is completed and the water may flow freely through the body 20.

With my invention it will be observed that means are provided for controlling the flow of the water by the attendant while he is at the nozzle end of the hose and therefore it will not require the attendant to leave the nozzle and go to a point comparatively remote to shut off the water or to regulate the flow thereof. Hence considerable time is saved and also the water is prevented from being wasted.

Having described the invention what is claimed is:—

A valve comprising an elongated body having its side and bottom walls offset at a point intermediate its ends, said offset in the side walls of the body being arcuate in section, said offsets in the bottom walls being semi-spherical to provide a seat, an internally screw threaded boss formed on the body in vertical alignment with said seat, a valve stem journaled in the boss, a stuffing gland in the boss, a packing in said boss and engaged by said gland and adapted to be moved inwardly thereby, a valve head formed on the stem, said valve head being cylindrical and provided with semi-spherical ends, the side of said valve head contacting with the arcuate portions of the offset side walls of the body, one semi-spherical end of said guide head engaging the seat and the other end engaging the packing of the stuffing gland, said valve head having a recess in one side to permit the passage of fluid through the body when said head is in one position, and said valve adapted to be
5 held tightly on its seat by adjusting said gland inwardly and thereby compressing the packing.

In testimony whereof I affix my signature in presence of two witnesses.

ULRICH REIDT.

Witnesses:
  G. W. FISCHER,
  D. H. HILL.